(12) United States Patent
Manaka

(10) Patent No.: US 6,755,015 B1
(45) Date of Patent: Jun. 29, 2004

(54) APPARATUS FOR PURIFYING AND CONTROLLING EXHAUST GASES

(75) Inventor: Toshio Manaka, Hitachinaka (JP)

(73) Assignee: Hitachi, Ltd., Tokyo (JP)

(*) Notice: Subject to any disclaimer, the term of this patent is extended or adjusted under 35 U.S.C. 154(b) by 0 days.

(21) Appl. No.: 09/571,984

(22) Filed: May 16, 2000

(30) Foreign Application Priority Data

Aug. 9, 1999 (JP) .......................... 11-224910

(51) Int. Cl.⁷ .............................................. F01N 3/00
(52) U.S. Cl. ........................... 60/297; 60/274; 60/285; 60/295; 60/301; 422/171; 422/177
(58) Field of Search .................. 60/274, 285, 286, 60/295, 297, 301, 303; 422/169, 170, 171, 177

(56) References Cited

U.S. PATENT DOCUMENTS

| | | | |
|---|---|---|---|
| 5,437,153 A | | 8/1995 | Takeshima et al. |
| 5,450,722 A | * | 9/1995 | Takeshima et al. ............ 60/285 |
| 5,595,060 A | | 1/1997 | Togai et al. |
| 5,657,625 A | | 8/1997 | Koga et al. |
| 5,715,679 A | * | 2/1998 | Asanuma et al. ............. 60/276 |
| 5,771,686 A | * | 6/1998 | Pischinger et al. ........... 60/274 |
| 5,839,275 A | * | 11/1998 | Hirota et al. ................. 60/285 |
| 5,884,476 A | * | 3/1999 | Hirota et al. ................. 60/278 |
| 5,974,788 A | * | 11/1999 | Hepburn et al. ............. 60/274 |

FOREIGN PATENT DOCUMENTS

WO    WO 97/47864    12/1997

* cited by examiner

*Primary Examiner*—Binh Tran
(74) *Attorney, Agent, or Firm*—Crowell & Moring LLP (57) ABSTRACT

An apparatus for purifying and controlling exhaust gases having $NO_x$ adsorption catalyst in the exhaust gas duct therein, and conducting exhaust gas purification by adsorbing or capturing $NO_x$ in the oxidative atmosphere of lean exhaust gas, producing a reductive atmosphere and regenerating the adsorption catalyst, characterized by carrying out a reduction treatment of $NO_x$ on the basis of a calculated quantity of adsorbed $NO_x$, said calculated quantity of adsorbed $NO_x$ being obtained by subtracting the quantity of $NO_x$ directly reduced to $N_2$ from the total $NO_x$ in exhaust gas, can maintain the $NO_x$ purification rate in the lean burn exhaust gas of internal combustion engine always at a prescribed level or above and thereby lowering the quantity of discharged harmful exhaust gas.

19 Claims, 7 Drawing Sheets

APPARATUS FOR PURIFYING AND CONTROLLING EXHAUST GASES

BACKGROUND OF THE INVENTION

The present invention relates to an apparatus for purifying and controlling exhaust gases discharged from internal combustion engine or the like of automobiles, etc., and particularly to an apparatus for purifying and controlling the exhaust gases discharged from an automobile equipped with an internal combustion engine which can be driven at a lean burn.

The exhaust gases discharged from the internal combustion engine of automobile, etc. contain oxygen monoxide (CO), hydrocarbons (HC), nitrogen oxides ($NO_x$), etc., and these gases act as air-polluting substances to cause various problems. A great endeavor has been made so far for decreasing the discharge of these gases. Thus, it has been studied to decrease the generation of these gases by improving the combustion method in internal combustion engines. In addition, a method for purifying the discharged exhaust gas by the use of a catalyst or the like has also been studied to achieve considerable results. Today, in the field of gasoline engines, predominant is the use of a ternary catalyst composed of Pt and Rh as main components with which the exhaust gas can be made harmless through a simultaneous oxidation of HC and CO and reduction of $NO_x$.

Said ternary catalyst, however, can effectively be used, in its nature, only for exhaust gases formed from a combustion in which the air/fuel ratio is in neighborhood of the theoretical air/fuel ratio. Although the air/fuel ratio varies with the conditions of driving the automobile, the range of the variation has hitherto been regulated so as to fall in the neighborhood of the theoretical air/fuel ratio as a rule (theoretical air/fuel ratio=A (weight of air)/F (weight of fuel); in case of gasoline, A/F=ca. 14.7; in this specification, the theoretical air/fuel ratio A/F is fixed at 14.7, even though it may vary depending on the kind of fuel). However, if an engine can be driven at an air/fuel ratio leaner than the theoretical air/fuel ratio, specific fuel consumption will be improved. Accordingly, the technique of lean burn combustion has been studied, and in many of the today's automobiles, the internal combustion engine is driven in the lean burn zone where air/fuel ratio is 18 or above. Although the existing ternary catalyst can purify the HC and CO in the lean-burn exhaust gas oxidatively as has been mentioned above, it cannot reductively purify the $NO_x$ effectively. Accordingly, a technique for purifying exhaust gases capable of coping with lean burn driving must be developed in order to apply the lean burn technique to large-sized automobiles and prolong the lean burn combustion time (expansion of the driving condition zone to which lean burn technique can be applied). For such a reason, a technique for purifying exhaust gases capable of coping with the lean burn, namely a technique for purifying HC, NO and $NO_x$ and especially $NO_x$ from an exhaust gas having a high oxygen content, is being studied energetically.

In Japanese Patent 2586739 (U.S. Pat. No. 5,437,153), there is proposed an apparatus for purifying exhaust gases provided with an $NO_x$ absorbent and an $NO_x$ releasing means in the exhaust pipe of an internal combustion engine, said apparatus acting so as to estimate the quantity of $NO_x$ absorbed on the $NO_x$ absorbent and, when the estimated quantity of absorbed $NO_x$ has exceeded a previously determined allowable limit, to lower the oxygen concentration in the exhaust gas flowing into the $NO_x$ absorbent and thereby releases $NO_x$ from the $NO_x$ absorbent. On the other hand, a method for making $NO_x$ harmless by $NO_x$ adsorption instead of $NO_x$ absorption is proposed in JP-A 10-212933 (WO97/47864). According to the method of JP-A 10-212933, there is proposed a function of directly reducing $NO_x$ to harmless $N_2$ with an adsorbent highly reactive with $NO_x$.

According to the prior art, the captured $NO_x$ is made harmless by changing the air/fuel ratio to the theoretical air/fuel ratio or a rich air/fuel ratio. Although this changeover of air/fuel ratio is carried out by estimating the quantity of adsorbed $NO_x$, no consideration is made there about the function of $NO_x$ adsorption catalyst that can make $NO_x$ harmless by its direct reduction into $N_2$.

BRIEF SUMMARY OF THE INVENTION

The present invention relates to an apparatus for purifying and controlling exhaust gases which uses an $NO_x$ adsorption catalyst, and an object of the present invention is to provide an apparatus for purifying and controlling exhaust gases with which the $NO_x$ adsorbed on the $NO_x$ adsorption catalyst can be reduced in a proper timing with high accuracy.

The present invention provides an exhaust gas purification apparatus for use in a lean burn internal combustion engine comprising:

an exhaust gas duct connected to an engine through which an exhaust gas containing $NO_x$ gas passes, an $NO_x$ adsorption catalyst disposed in said exhaust gas duct, said adsorption catalyst being able to chemically adsorb a part of $NO_x$ in the exhaust gas in a lean burn state wherein the amount of an oxidizing agent is larger than the amount of a reducing agent in a redox stoichiometric relation of components in the exhaust gas and to catalytically reduce $NO_x$ adsorbed on the catalyst in a state wherein the amount of the reducing agent is equal to or larger than the amount of the oxidizing agent, and a control apparatus which decides a timing for producing a state wherein the amount of the reducing agent is equal to or larger than the amount of the oxidizing agent, and carries out reduction treatment of the $NO_x$ adsorbed on the adsorption catalyst by catalytical reaction with the reducing agent to form harmless $N_2$, when the $NO_x$ adsorbed amount reaches a predetermined amount, which is calculated from the $NO_x$ amount obtained by subtracting the amount of $NO_x$ directly reduced to $N_2$ during the lean burn state from the amount of $NO_x$ discharged from the internal combustion engine.

The present invention also provides an exhaust gas purification apparatus for use in a lean burn internal combustion engine comprising:

an exhaust gas duct connected to an engine through which an exhaust gas containing $NO_x$ gas passes, an $NO_x$ adsorption catalyst disposed in said exhaust gas duct, said adsorption catalyst containing as apart of catalyst components at least one element selected from the group consisting of potassium, sodium, magnesium, strontium and calcium, and being able to chemically adsorb a part of $NO_x$ in the exhaust gas in a lean burn state wherein the amount of an oxidizing agent is larger than the amount of a reducing agent in a redox stoichiometric relation of components in the exhaust gas and to catalytically reduce $NO_x$ adsorbed on the catalyst in a state wherein the amount of the reducing agent is equal to or larger than the amount of the oxidizing agent, and a control apparatus which decides a timing for producing a state wherein the amount of the reducing agent is equal to or larger than the amount of the oxidizing agent, and carries out reduction treatment of the $NO_x$ adsorbed on the adsorbing catalyst by catalytical reaction with the reducing agent to form harmless $N_2$, when the $NO_x$ adsorbed amount reaches a predetermined amount, which is calculated from the $NO_x$ amount obtained by subtracting the amount of $NO_x$ directly reduced to $N_2$ during the lean burn state from the amount of $NO_x$ discharged from the internal combustion engine.

DETAILED DESCRIPTION OF THE INVENTION

The above-mentioned problem of timing of the reduction treatment of $NO_x$ adsorbed on an $NO_x$ adsorption catalyst can be solved by carrying out the reduction treatment at the time when the quantity (or amount) of $NO_x$ calculated by subtracting the quantity (or amount) of $NO_x$ directly reduced to $N_2$ from the quantity (or amount) of $NO_x$ discharged (or exhausted) from an internal combustion engine has reached a predetermined amount, while having noticed a fact that the $NO_x$ adsorption catalyst reduce a part of $No_x$ to $N_2$ even in a lean driving. By this method, the reduction treatment of $NO_x$ can be started in a good timing for treating the exhaust gas, and therefore the level of exhaust gas can be maintained always under the value of regulation. According to the present invention, an $NO_x$ adsorbing (or capturing) catalyst is provided in the exhaust gas passage (duct), said catalyst chemically adsorbing $NO_x$ from an exhaust gas in a state wherein, in the redox stoichiometric relation between components of exhaust gas, the quantity of oxidizing agent is larger than the quantity of reducing agent, and catalytically reducing the adsorbed $NO_x$ in a state wherein the quantity of reducing agent is not smaller than the quantity of oxidizing agent. Thus, the exhaust gas purification apparatus produces a state wherein, in a redox stoichiometric relation between the components of exhaust gas, the quantity of oxidizing agent is larger than the quantity of reducing agent and, in such a state, chemically adsorbs $NO_x$ on the adsorbing catalyst, and then produces a state wherein the quantity of reducing agent is not smaller than the quantity of oxidizing agent and, in such a state, contacts and reacts the $NO_x$ adsorbed on the adsorbing catalyst with the reducing agent and thereby reduces the $NO_x$ to harmless $N_2$, and the apparatus further makes $NO_x$ harmless by its direct reduction to $N_2$.

The term "adsorbing (or capturing) catalyst" means a material having an ability of adsorbing substances such as $NO_x$, etc. and at the same time having a catalytic function. In the present specification, the term means a material having an ability of adsorbing and capturing $NO_x$, an ability of catalytically reducing $NO_x$ and an ability of catalytically oxidizing HC, CO, etc.

The $NO_x$ adsorption catalyst used in the present invention adsorbs $NO_x$ in an exhaust gas during a lean driving as $NO_2$ on the adsorption catalyst, directly reduce a part of $NO_x$ to $N_2$ using HC, CO, etc. in the exhaust gas, and captures apart of $NO_x$ as $NO_2$ on the adsorption catalyst. The adsorbed and/or captured $NO_2$ is reduced to $N_2$ at a time of stoichiometric or rich A/F ratio. The $NO_x$ adsorption catalyst used in the present invention is explained in detail in WO97/47864 (=U.S. Ser. No. 09/202,243) titled "EXHAUST GAS PURIFICATION APPARATUS OF INTERNAL COMBUSTION ENGINE AND CATALYST FOR PURIFYING EXHAUST GAS OF INTERNAL COMBUSTION ENGINE, said application is fully incorporated herein by reference. The adsorption catalyst contains K, Na, Mg, Sr, etc. as a base material for adsorbing $NO_x$. The $NO_x$ adsorbing material is combined with Ti, Si, etc. to form a composite oxide. By adjusting solid basicity, an adsorption ability is controlled so as to adsorb and/or capture as $NO_2$ on the surface of the catalyst, thereby inhibiting absorption in the form of $NO_3$— in the inner portion of the catalyst.

The term "oxidizing agent" inclusively means $O_2$, NO, $NO_2$, etc. and especially means oxygen gas. The term "reducing agent" inclusively means HC supplied to an internal combustion engine, other HC as derivatives of the supplied HC, including oxygen-containing HC, which can be formed in the process of combustion, CO, $H_2$, etc., and the reductive substances such as HC to be added to exhaust gas as a reductive component which will be mentioned later.

If a lean exhaust gas is brought into contact with HC, CO, $H_2$ or the like as reducing agents for reducing $NO_x$ to nitrogen, these reducing agents react with $O_2$ as oxidizing agent in the exhaust gas to cause combustion. $NO_x$ (NO and $NO_2$) also reacts therewith, and is reduced to nitrogen. Since both the reactions usually progress in parallel, the utilization rate of reducing agent is low in the presence of oxygen. Especially when the reaction temperature is so high as 500° C. or above (even though it may be dependent on the kind of catalyst material), proportion of the latter reaction is considerably high. Thus, it becomes possible to carry out the reduction of $NO_x$ to $N_2$ effectively by separating $NO_x$ from exhaust gas (at least from $O_2$ in the exhaust gas) by the use of adsorbing catalyst and thereafter contacting and reacting the $NO_x$ with a reducing agent. In the present invention, the $NO_x$ in exhaust gas is separated from $O_2$ by adsorbing $NO_x$ from the lean exhaust gas by the use of the adsorption catalyst.

In the $NO_x$ adsorption catalyst used in the present invention, in the next step, such a state wherein the quantity of reducing agent is equal to or larger than the quantity of oxidizing agent is produced in the redox system constituted of oxidizing agents ($O_2$, $NO_x$, etc.) and reducing agents (HC, CO, $H_2$, etc.), and the $NO_x$ adsorbed on the adsorbing catalyst is contacted and reacted with the reducing agent such as HC to reduce the $NO_x$ to $N_2$.

Now, roughly saying, the $NO_x$ in the exhaust gas comprises NO and $NO_2$. Since $NO_2$ is higher than NO in reactivity, $NO_2$ can be adsorbed off and reduced more easily than NO. Accordingly, oxidation of NO to $NO_2$ makes it easier to adsorb off and reduce $NO_x$ in exhaust gas. The present invention includes, too, a technique of oxidizing $NO_x$ present in lean exhaust gas to $NO_2$ by the action of the coexisting $O_2$ and thereby removing the $NO_x$, and the oxidizing means for this technique such as giving an NO-oxidizing function the adsorbing catalyst.

In the $NO_x$ adsorption catalyst used in the present invention, the reduction reaction of the chemically adsorbed $NO_x$ can be approximately expressed by the following reaction formula:

$$MO \cdot NO_2 + HC \rightarrow MO + N_2 + CO_2 + H_2O \rightarrow MCO_3 + N_2 + H_2O$$

wherein M is a metallic element. (The reason why $MCO_3$ is adopted as the reduced product is mentioned later.)

The reaction mentioned above is an exothermic reaction. If an alkali metal (Na is adopted as its typical example) and an alkaline earth metal (Ba is adopted as its typical example) are adopted as the metal M, the heat of reaction in the normal state (1 atmosphere, 25° C.) can be calculated as follows:

$$2NaNO_3(s) + 5/9 C_3H_6 \rightarrow Na_2CO_3(s) + N_2 + 2/3 CO_2 + 5/3 H_2O \ [-\Delta H = 873 \text{ kilojoules/mole}]$$

$$Ba(NO_3)_2 + 5/9 C_3H_6 \rightarrow BaCO_3(s) + N_2 + 2/3 CO_2 + 5/3 H_2O \ [-\Delta H = 751 \text{ kilojoules/mole}]$$

wherein s means solid and g means gas.

As the thermodynamic quantities of the adsorbed species, the values of the corresponding solids are used.

Additionally saying, the heat of combustion of 5/9 mole of $C_3H_6$ is 1,070 kilojoules, so that the heat of combustion of the reactions mentioned above can be said to be both comparable to the heat of combustion of HC. Naturally, this heat generated is transferred to the contacted exhaust gas, and local rise in temperature of the adsorbing catalyst surface can be avoided.

In a case where the $NO_x$-capturing agent is an $NO_x$-absorbent, the $NO_x$ captured in the bulk mass of absorbent is also reduced, due to which the generation of heat increases. Since the transfer of heat to the exhaust gas is limited, this generation of heat brings about a rise in temperature of the absorbent. This generation of heat shifts the equilibrium of the following absorbing reaction to the release side, wherein the left side is release side and the right side is absorption side.

$$MCO_3(s) + 2NO_2 + 1/2 O_2 \rightleftharpoons M(NO_3)_2 + CO_2$$

Even if the concentration of reducing agent is enhanced with the aim of reducing the released $NO_x$ immediately and lowering the concentration of $NO_x$ in the exhaust gas discharged out of the apparatus, the gas phase reaction between $NO_2$ and HC does not progress rapidly and therefore there is a possibility that the quantity of released $NO_x$ cannot sufficiently be decreased by increasing the amount of reducing agent. It may be thought out to carry out the reduction in a step where the quantity of $NO_x$ is yet small, such a technique increases the frequency of regeneration of $NO_x$ absorber and lowers the effect of improving the specific fuel consumption.

The adsorbing catalyst used in the present invention captures $NO_x$ only in the neighborhood of its surface. Thus, its heat of generation is small as an absolute value. Further, the heat is rapidly transferred to the exhaust gas, so that the adsorbing catalyst shows only a small rise in temperature. Accordingly, release of the $NO_x$ once captured can be prevented satisfactorily.

The $NO_x$-adsorbing catalyst used in the present invention is characterized in that it captures $NO_x$ at surface thereof by a chemical adsorption and, in the step of reducing $NO_x$, the generation of heat causes no release of $NO_x$. The $NO_x$ adsorption catalyst used in the present invention is further characterized in that it captures $NO_x$ by a chemical adsorption at surface thereof or by chemical bond formation in the neighborhood of surface thereof and, in the step of reducing $NO_x$, generation of heat causes no release of $NO_x$.

The present inventors have found that the above-mentioned characteristic features can be realized by an $NO_x$ adsorption catalyst containing, as a part of its components, at least one element selected from the group consisting of potassium (K), sodium (Na), magnesium (Mg), strontium (Sr) and calcium (Ca).

The exhaust gas purification apparatus for purifying exhaust gas of internal combustion engine to which the present invention is applied is provided in its exhaust gas duct (passage) with an $NO_x$ adsorption catalyst containing at least one element selected from the group consisting of potassium (K), sodium (Na), magnesium (Mg), strontium (Sr) and calcium (Ca) as a part of the components thereof, and it produces a state that, in a redox stoichiometric relation between the components of exhaust gas, the quantity of oxidizing agent is larger wherein the quantity of reducing agent and, in such a state, chemically adsorbs $NO_x$ on the $NO_x$ adsorption catalyst, and then produces a state wherein the quantity of reducing agent is not smaller than the quantity of oxidizing agent and, in such a state, contacts and reacts the $NO_x$ adsorbed on the catalyst with a reducing agent to reduce the $NO_x$ to harmless $N_2$.

Further, the exhaust gas purification apparatus for purifying exhaust gas of internal combustion engine to which the present invention is applied is provided in the exhaust gas duct with an $NO_x$ adsorption catalyst containing at least one elements selected from the group consisting of potassium (K), sodium (Na), magnesium (Mg), strontium (sr) and calcium (Ca) as a part of the components thereof, and it produces a state wherein, in a redox stoichiometric relation between the components of exhaust gas, the quantity of oxidizing agent such as $O_2$, etc. is larger than the quantity of reducing agent such as HC, etc. and, in such a state, chemically adsorbs $NO_x$ on the $NO_x$ adsorption catalyst, and then produces a state wherein the quantity of reducing agent is not smaller than the quantity of oxidizing agent and, in such a state, contacts and reacts the $NO_x$ adsorbed on the catalyst with a reducing agent to reduce the $NO_x$ to harmless $N_2$.

As the $NO_x$ adsorption catalyst used in the present invention, the following one is especially preferable:

a composition comprising metals and metal oxides (or composite oxides) containing at least one element selected from the group consisting of potassium (K), sodium (Na), magnesium (Mg), strontium (Sr) and calcium (Ca), at least one member selected such as consisting of cerium, etc. and at least one element selected from noble metals such as platinum, rhodium, palladium, etc.; and a composition prepared by supporting the above-mentioned composition on a porous, heat-resistant metallic oxide. These compositions have an excellent $NO_x$-adsorbing performance and, in addition, an excellent $SO_x$ resistance.

In the present invention, the state wherein the quantity of reducing agent is not smaller than the quantity of oxidizing agent can be produced by the following method.

In an internal combustion engine, the condition of combustion is adjusted to a theoretical air-fuel ratio or a fuel-rich ratio. Alternatively, a reducing agent is added to a lean burn exhaust gas.

The former can be achieved by the following method:
a method of controlling the quantity of injected fuel in accordance with the output of oxygen concentration sensor and the output of suction gas flow rate sensor. This method includes a method of bringing a part of the multiple cylinders into a fuel-excess state and bringing the remainder into a fuel-deficient state and thereby producing a state that the quantity of reducing agent is not smaller than the quantity of oxidizing agent in the redox stoichiometric relation of the component of mixed exhaust gas discharged from whole cylinders.

The latter can be achieved by the following method:
a method of adding a reducing agent to the upstream zone of the adsorbing catalyst in the exhaust gas stream. As said reducing agent, gasoline, light oil, kerosene, natural gas and modified products thereof which are used as a fuel of the internal combustion engine, as well as hydrogen, alcohol, ammonia, etc. can be used.

A method of leading blow-by gas or canister purge gas to the upstream zone of adsorbing catalyst and adding the reducing agent present in these gases such as hydrocarbon or the like into the zone is also an effective method. In a fuel direct injection type internal combustion engine, it is effective to inject fuel in the gas discharging stroke and throw a fuel as a reducing agent.

The adsorption catalyst used in the present invention can be used in a variety of forms. The usable forms include a honeycomb form prepared by coating a honeycomb structure made of a metallic material such as cordierite, stainless steel or the like with an adsorbing catalyst component, as well as pellet-form, plate form, granular form, and powdery form.

The timing for producing a state wherein the quantity of reducing agent is not smaller than the quantity of oxidizing agent can be decided according to the following methods, provided that the fundamental condition is to carry out the reduction treatment when the quantity of adsorbed $NO_x$ calculated by subtracting the quantity of $NO_x$ directly reduced to $N_2$ from the quantity of $NO_x$ discharged from the internal combustion engine has reached a predetermined amount:

(1) when the $NO_x$ discharge quantity at the time of lean driving (or running) is estimated from air/fuel ratio pre-setting signal determined by ECU (Engine Control Unit), engine rotational frequency signal, suction air quantity signal, suction air pipe pressure signal, speed signal, degree of throttle opening, exhaust gas temperature, etc. and its integrated value has exceeded a prescribed value;

(2) when the accumulated oxygen quantity is detected based on the signal of oxygen sensor (or A/F sensor) placed in the upstream zone or down-stream zone of adsorbing catalyst in the exhaust gas passage (duct) and the accumulated oxygen quantity has exceeded a prescribed value or, as a modified embodiment thereof, when the accumulated oxygen quantity at the time of lean driving has exceeded a prescribed value;

(3) when the accumulated quantity of $NO_x$ has exceeded a prescribed value, said accumulated quantity of $NO_x$ being calculated based on the signal of $NO_x$ sensor placed in the upstream zone of the adsorbing catalyst in the exhaust gas passage (duct);

(4) when the $NO_x$ concentration at the time of lean driving detected from the signal of $NO_x$ sensor placed in the downstream zone of the adsorbing catalyst in the exhaust gas passage has exceeded a prescribed value; or when the $NO_x$ purification rate calculated based on the signals of $NO_x$ sensors placed in the upstream and downstream zones of the adsorbing catalyst has become below a prescribed value; and (5) when the estimated $NO_x$ purification rate of $NO_x$ adsorption catalyst has become below a prescribed value, said $NO_x$ purification rate being estimated from at least one quantity of state selected from the quantity of $NO_x$ adsorbed on $NO_x$ adsorption catalyst; the temperature of exhaust gas; the temperature of the adsorbing catalyst; the quantity of sulfur poisoning the catalyst; the driving distance of automobile; the degree of deterioration of the catalyst; the air/fuel ratio; the concentration of non-burnt hydrocarbon; $NO_x$ concentration on the catalyst, the time of lean driving measured from the point in time of changing the driving at theoretical air/fuel ratio or a rich driving to the lean driving; the rotational frequency (or rotation number) of internal combustion engine; the load of the engine; the quantity (or amount) of air inlet into the engine; and the quantity (or amount) of exhaust gas.

As mentioned above, the period of time during which the state wherein the quantity of reducing agent is not smaller than the quantity of oxidizing agent is maintained or the quantity of reducing agent which should be used for the purpose of maintaining said state can be determined previously by taking the characteristics of the adsorbing catalyst and the dimensions and characteristics of the internal combustion engine into account. Such conditions can be realized by increasing the quantity of fuel injected from the injection valve into the cylinders, or by supplying the fuel into the cylinders during the expanding stroke of the internal combustion engine or by supplying the fuel into the exhaust gas pipe.

As mentioned above, the explanation is mainly made as to the use of the $NO_x$ adsorption catalyst. But the present invention can also be applied to a system using an $NO_x$ catalyst, wherein the $NO_x$ catalyst can not only capture a part of $NO_x$ in the exhaust gas during a lean driving, but also directly reduce a part of $NO_x$ in the exhaust gas using HC and CO in the exhaust gas, and reduce the captured $NO_x$ to $N_2$ at a time of stoichiometric or rich A/F ratio. Even in the case of using the $NO_x$ catalyst, the decision of timing of reduction treatment of $NO_x$ can be made, as in the case of using the $NO_x$ absorption catalyst, not-depending on the simple accumulation of generated amount of $No_x$, but depending on the $NO_x$ captured amount obtained by subtracting the amount of $NO_x$ directly redxuced to $N_2$ during the lean burn state from the amount of $NO_x$ discharged from the internal combustion engine.

Thus, the present invention also provides an exhaust gas purification apparatus for use in a lean burn internal combustion engine comprising:

an exhaust gas duct connected to an engine through which an exhaust gas containing $NO_x$ gas passes, an $NO_x$ capturing catalyst disposed in said exhaust gas duct, said catalyst being able to capture a part of $NO_x$ in the exhaust gas in a lean burn state wherein the amount of an oxidizing agent is larger than the amount of a reducing agent in a redox stoichiometric relation of components in the exhaust gas and to catalytically reduce $NO_x$ captured by the catalyst in a state wherein the amount of the reducing agent is equal to or larger than the amount of the oxidizing agent, and a control apparatus which decides a timing for producing a state wherein the amount of the reducing agent is equal to or larger than the amount of the oxidizing agent, and carries out reduction treatment of the $NO_x$ captured by the catalyst by catalytical reaction with the reducing agent to form harmless $N_2$, when the $NO_x$ captured amount reaches a predetermined amount, which is calculated from the $NO_x$ amount obtained by subtracting the amount of $NO_x$ directly reduced to $N_2$ during the lean burn state from the amount of $NO_x$ discharged from the internal combustion engine.

Next, concrete embodiments of the apparatus for purifying and controlling exhaust gases of the present invention will be described below.

[I]. An exhaust gas purification apparatus for use in a lean burn internal combustion engine comprising:

an exhaust gas duct connected to an engine through which an exhaust gas containing $NO_x$ gas passes, an $NO_x$ adsorption catalyst disposed in said exhaust gas duct, said adsorption catalyst being able to chemically adsorb a part of $NO_x$ in the exhaust gas in a lean burn state wherein the amount of an oxidizing agent is larger than the amount of a reducing agent in a redox stoichiometric relation of components in the exhaust gas and to catalytically reduce $NO_x$ adsorbed on the catalyst in a state wherein the amount of the reducing agent is equal to or larger than the amount of the oxidizing agent, and a control apparatus which decides a timing for producing a state wherein the amount of the reducing agent is equal to or larger than the amount of the oxidizing agent, and carries out reduction treatment of the $NO_x$ adsorbed on the adsorption catalyst by catalytical reaction with the reducing agent to form harmless $N_2$, when the $NO_x$ adsorbed amount reaches a predetermined amount, which is calculated from the $NO_x$ amount obtained by subtracting the amount of $NO_x$ directly reduced to $N_2$ during the lean burn state from the amount of $NO_x$ discharged from the internal combustion engine.

[II]. An exhaust gas purification apparatus for use in a lean burn internal combustion engine comprising:

an exhaust gas duct connected to an engine through which an exhaust gas containing $NO_x$ gas passes, an $NO_x$ adsorption catalyst disposed in said exhaust gas duct, said adsorption catalyst containing as apart of catalyst components at least one element selected from the group consisting of potassium, sodium, magnesium, strontium and calcium, and being able to chemically adsorb a part of $NO_x$ in the exhaust gas in a lean burn state wherein the amount of an oxidizing agent is larger than the amount of a reducing agent in a redox stoichiometric relation of components in the exhaust gas and to catalytically reduce $NO_x$ adsorbed on the catalyst in a state wherein the amount of the reducing agent is equal to or larger than the amount of the oxidizing agent, and a control apparatus which decides a timing for producing a state wherein the amount of the reducing agent is equal to or larger than the amount of the oxidizing agent, and carries out reduction treatment of the $NO_x$ adsorbed on the adsorbing catalyst by catalytical reaction with the reducing agent to form harmless $N_2$, when the $NO_x$ adsorbed amount reaches a predetermined amount, which is calculated from the $NO_x$ amount obtained by subtracting the amount of $NO_x$ directly reduced to $N_2$ during the lean burn state from the amount of $NO_x$ discharged from the internal combustion engine.

[III]. An exhaust gas purification apparatus for use in a lean burn internal combustion engine comprising:

an exhaust gas duct connected to an engine through which an exhaust gas containing $NO_x$ gas passes, an $NO_x$ adsorption catalyst disposed in said exhaust gas duct, said adsorption catalyst containing as a part of catalyst components at least one element selected from the group consisting of potassium, sodium, magnesium, strontium and calcium, and being able to capture a part of $NO_x$ by chemical bonding in the exhaust gas on a surface and near the surface of the adsorption catalyst in a lean burn state wherein the amount of an oxidizing agent including an oxygen gas is larger than the amount of a reducing agent including a hydrocarbon in a redox stoichiometric relation of components in the exhaust gas, and to catalytically reduce $NO_x$ captured on the catalyst in a state wherein the amount of the reducing agent is equal to or larger than the amount of the oxidizing agent, and a control apparatus which decides a timing for producing a state wherein the amount of the reducing agent is equal to or larger than the amount of the oxidizing agent, and carries out reduction treatment of the $NO_x$ captured on the adsorbing catalyst by catalytical reaction with the reducing agent to form harmless $N_2$, when the $NO_x$ captured amount reaches a predetermined amount, which is calculated from the $NO_x$ amount obtained by subtracting the amount of $NO_x$ directly reduced to $N_2$ during the lean burn state from the amount of $NO_x$ discharged from the internal combustion engine.

[IV]. An apparatus as mentioned in Embodiment [I] or [II], wherein said adsorption catalyst is a composition comprising metals and metal oxides or composite oxides containing at least one element selected from the group consisting of potassium (K), sodium (Na), magnesium (Mg), strontium (Sr) and calcium (Ca); at least one element selected from rare earth elements such as cerium and the like; and at least one element selected from noble metals such as platinum, rhodium, palladium and the like, or said composition supported on a porous, heat-resistant metal oxide.

[V]. An apparatus as mentioned in Embodiment [I] or [II], wherein said adsorbing catalyst is a composition comprising metals and metal oxides or composite oxides containing at least one element selected from the group consisting of potassium (K), sodium (Na), magnesium (Mg), strontium (Sr) and calcium (Ca); at least one element selected from rare earth elements such as cerium and the like; at least one element selected from noble metals such as platinum, rhodium, palladium and the like; and at least one element selected from the group consisting of titanium and silicon, or said composition supported on a porous, heat-resistant metal oxide.

[VI]. An apparatus as mentioned in any one of Embodiments [I] to [V], wherein the reduction treatment of the $NO_x$ adsorbed on the $NO_x$ adsorption catalyst is carried out by increasing a concentration of a non-burnt hydrocarbon in the exhaust gas flowing into the catalyst.

[VII] An apparatus as mention in any one of Embodiment [I] to [V], wherein the quantity of adsorbed $NO_x$ is estimated on the basis of at least one quantity of state selected from an ability of directly reducing $NO_x$ to $N_2$ and thereby making the $NO_x$ harmless; a temperature of exhaust gas;

a temperature of said adsorbing catalyst; a quantity of sulfur poisoning the catalyst; a driving distance of automobile; a degree of deterioration of the catalyst; an air/fuel ratio; a concentration of non-burnt hydrocarbon; $NO_x$ concentration on the catalyst; a time of lean driving measured from the point in time of changing the driving at theoretical air/fuel ratio or a rich driving to a lean driving; a rotation number (or engine rotational speed) of internal combustion engine; a load of the engine; a quantity of air inlet into the engine; and a quantity of exhaust gas.

[VIII] An apparatus as mentioned in any one of Embodiments [I] to [VII], wherein the reduction treatment of the $NO_x$ adsorbed on the $NO_x$ adsorption catalyst is carried out, in the case where a variation of torque appears, by controlling the output torque of the internal combustion engine so as to suppress the variation of torque.

[IX]. An apparatus as mentioned in Embodiment [VIII], wherein the control of output torque is carried out by changing at least one factor selected from a time of ignition, a quantity (or amount) of inlet air, a quantity (or amount) of exhaust gas to be mixed into suction gas of internal combustion engine (EGR ratio), a quantity (or amount) of injected fuel, a timing of fuel injection, an electromotive motor assisting the internal combustion engine, a load of dynamo provided in the engine, and breaking in the output side of the engine.

[X] A control apparatus used in an apparatus for purifying an exhaust gas from a lean burn internal combustion engine for example, as mentioned in any one of Embodiment [I] to [IX], comprising a means for deciding a timing for producing a state wherein the quantity of a reducing agent is equal to or larger than the quantity of an oxidizing agent, and a means for carrying out a reduction treatment of $NO_x$ absorbed on an adsorbing catalyst by catalytical reaction with the reducing agent to form harmless $N_2$, when the amount of $NO_x$ adsorbed on the adsorbing catalyst reaches a predetermined amount, which is calculated from an $NO_x$ amount obtained by subtracting an amount of $NO_x$ directly reduced to $N_2$ during a lean burn state from an amount of $NO_x$ discharged from the internal combustion engine.

Next, the present invention is explained in more detail by referring to concrete embodiments of the invention. Needless to say, the present invention is by no means limited to the embodiments mentioned above and examples mentioned below, and a variety of embodiments can be adopted within the inventive idea of the present invention.

Adsorption Catalyst

The characteristic properties of the adsorption catalyst used in the present invention will be explained below. Characteristic properties of N-N9 containing Na as alkali metal and N-K9 containing K as alkali metal are as follows.
<<Method for Preparing Adsorption Catalyst>>

[i] Adsorption Catalyst N-N9 was Prepared by the Following Method.

A nitric acid-acidified alumina slurry was prepared by agitating an alumina sol as a binder which was obtained by nitric acid-peptization of alumina powder and boehmite. In the coating fluid thus obtained was dipped a honeycomb structure, and then the structure was immediately taken out. After removing the fluid kept in the cells by means of air blow, the coated structure was dried and calcined at 450° C. This procedure was repeated until the quantity of alumina coating had reached 150 g per liter of the apparent volume of the honeycomb. Then, active components of catalyst were supported on the alumina-coated honeycomb to obtain a honeycomb-form adsorbing catalyst. For example, a honeycomb structure was impregnated with a solution of cerium nitrate (Ce nitrate), dried and then calcined at 600° C. for one hour. Subsequently, it was calcined with a mixed solution containing a solution of sodium nitrate (Na nitrate), a titania sol solution and a solution of magnesium nitrate (Mg nitrate), and dried and calcined in the same manner as above. Further, it was impregnated with a mixed solution containing dinitrodiamine Pt nitrate solution and a solution of rhodium nitrate (Rh nitrate) and calcined at 450° C. for one hour. Thus, there was obtained a honeycomb-form adsorbing catalyst supporting Ce, Mg, Na, Ti, Rh and Pt on alumina ($Al_2O_3$), namely 2Mg-(0.2Rh, 2.7Pt)-(18Na, 4Ti, 2Mg)-27Ce/$Al_2O_3$. Herein, the expression "/$Al_2O_3$" means that the active components are supported on $Al_2O_3$, and the numerical figures preceding the symbols of elements express the weight (g) of each metallic component supported per liter of apparent volume of the honeycomb. The order of expression indicates the order of supporting. That is to say, a component written closely to $Al_2O_3$ is supported before another component written at a longer distance from $Al_2O_3$, and the components written in one parenthesis are supported simultaneously. Additionally saying, the quantity of each component to be supported can be varied by changing the concentration of active component in the impregnating solution.

[ii] The Adsorption Catalyst N-K9 was Prepared by the Following Method.

The procedure for preparing the adsorption catalyst N-N9 was repeated, except that the solution of Na nitrate used in the preparation of N-N9 was replaced by a solution of potassium nitrate (K nitrate). As a result, there was obtained N-K9, namely 2Mg-(0.2Rh, 2.7Pt)-(18K, 4Ti, 2Mg)-27Ce/$Al_2O_3$. A control catalyst N-R2, namely 2Mg-(0.2Rh, 2.7Pt)-27Ce/$Al_2O_3$ was also prepared by the same procedure as above.

<<Method for Evaluation of Performance>>

The adsorption catalysts obtained above were heat-treated at 700° C. for 5 hours in an oxidative atmosphere, and their characteristic properties were tested in the following manner.

A honeycomb-form adsorbing catalyst having a volume of 1.7 L prepared according to the method of the present invention was mounted on a passenger car equipped with a lean burn-specification gasoline engine having a displacement of 1.8 L, and the $NO_x$-cleaning characteristics were evaluated.

<<Characteristic Properties of Adsorption Catalyst>>

Figure 2:
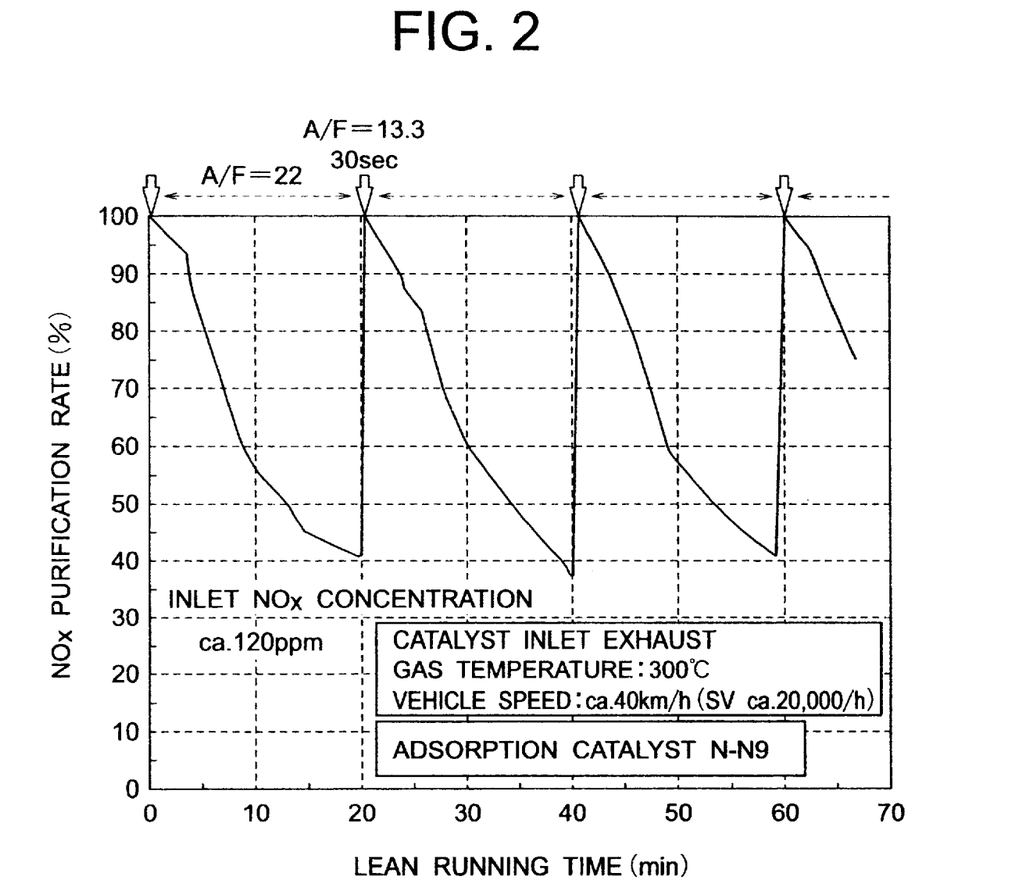
FIG. 2 is a graph illustrating the $NO_x$ purification rate with the lapse of time in an experiment of alternately repeating rich driving (or running) and lean driving (or running) with the apparatus of the present invention.

After mounting the adsorption catalyst N-N9, a rich driving of A/F=13.3 for 30 seconds and a lean driving of A/F=22 for about 20 minutes (the period of time required for decreasing the $NO_x$ purification rate to about 40%) were alternately repeated to obtain the $NO_x$ purification rate-time curve of FIG. 2. This result suggests that $NO_x$ can be purified by this adsorbing catalyst during the lean driving period (or running time). The $NO_x$ purification rate gradually decreased during the lean driving period, so that the purification rate which was 100% at the start of the lean driving decreased to about 40% with the lapse of time. However, the lowered purification rate was recovered to 100% by the rich driving for 30 seconds and the injection of fuel in the cylinder in the expanding stroke or gas-discharging stroke of the engine. Then, a lean driving was carried out again, and the $NO_x$ purification ability was recovered and the $NO_x$ purification rate dropped in the same manner as above. When the lean driving and rich driving (or running) were repeated multiple times, the decreasing velocity of $NO_x$ purification rate in the period of lean driving varied depending on the temperature of catalyst, the quantity of poisoning sulfur, the driving distance of automobile, the $NO_x$ concentration at inlet of catalyst, and the quantity of exhaust gas. Accordingly, it is important to estimate the $NO_x$ purification rate with high accuracy in accordance with the condition of driving.

Figure 3:
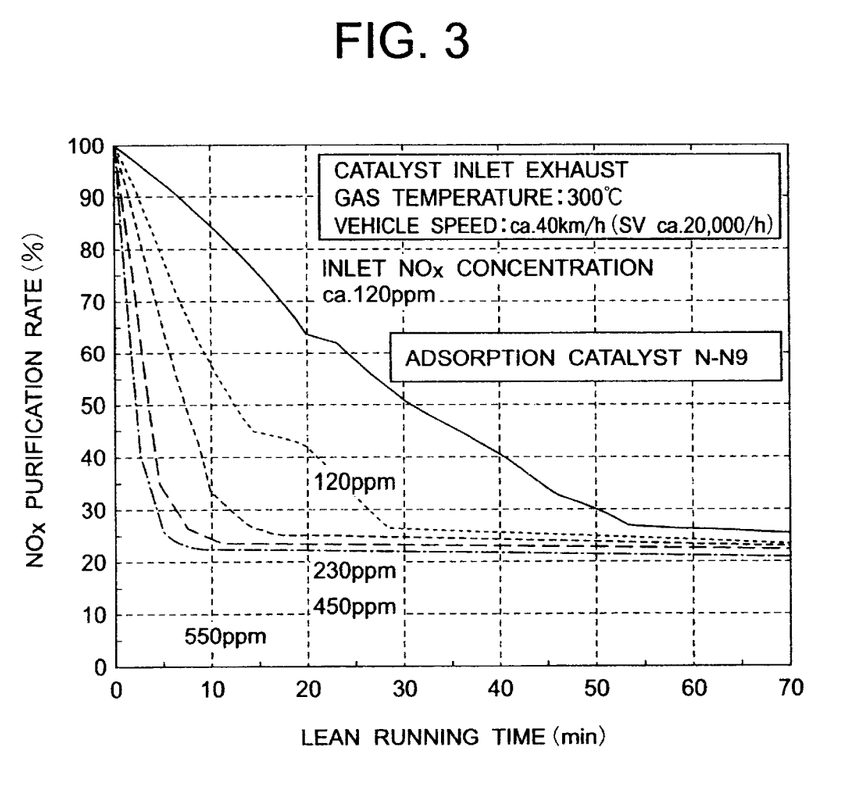
FIG. 3 is a graph illustrating the relation between $NO_x$ concentration and $NO_x$ purification rate in an exhaust gas.

At a constant driving speed of about 40 km/h (the space velocity (SV) of exhaust gas was a constant value of about 20,000/h), the time of ignition was varied to vary the $NO_x$ concentration in exhaust gas. FIG. 3 illustrates the relation between $NO_x$ concentration and $NO_x$ purification rate of lean exhaust gas. It is apparent that $NO_x$ purification rate decreases with time, the decreasing velocity is smaller at a lower $NO_x$ concentration. Even after the time when the quantity of adsorbed $NO_x$ is considered to have reached saturation, $NO_x$ purification rate is maintained at a level of 22–25%, demonstrating that a portion of $NO_x$ is directly reduced to $N_2$. The quantities of $NO_x$ captured by the time when the $NO_x$ purification rate reaches 50% and 30%, respectively, calculated from FIG. 3 are shown in Table 1.

TABLE 1

| $NO_x$ concentration in exhaust gas at inlet (ppm) | Quantity of $NO_x$ having been purified by the time when purification rate reached 50% (mol) | Quantity of $NO_x$ having been purified by the time when purification rate reached 30% (mol) |
| --- | --- | --- |
| ca. 50 ppm | 0.030 | 0.041 |
| ca. 120 ppm | 0.031 | 0.047 |
| ca. 230 ppm | 0.030 | 0.045 |
| ca. 450 ppm | 0.030 | 0.042 |
| ca. 550 ppm | 0.026 | 0.038 |

As seen, the quantity of captured $NO_x$ is approximately constant regardless of $NO_x$ concentration. It is a characteristic feature of chemical adsorption that the quantity of adsorption is independent of the concentration (pressure) of the substance adsorbed.

In the adsorbing catalyst, the substance which can be considered functioning as the adsorption medium first of all is Pt particles. According to the technique of CO adsorption evaluation which is frequently employed as a means for evaluating the quantity of exposed platinum, the quantity of adsorbed CO at 100° C. was $4.5 \times 1^{-4}$ mole. This value is equal to about 1/100 of the above-mentioned $NO_x$ adsorption, demonstrating that Pt is not the main adsorbing medium.

On the other hand, the BET specific surface area of this adsorption catalyst, measured by the method of nitrogen adsorption on the bulk mixture on cordierite, was about 25 $m^2/g$, which corresponded to a value of 28.050 $m^2$ per 1.7 L of honeycomb. A chemical investigation on the structure of Na in the adsorbing catalyst of the invention revealed that the Na existed as $Na_2CO_3$ predominantly, based on the findings that the catalyst dissolved in mineral acids with evolution of $CO_2$ gas and that the value of inflection point on its neutralizing titration curve with mineral acid suggested it. If it is assumed that the whole surface is occupied by $Na_2CO_3$, the quantity of $Na_2CO_3$ exposed on its surface must be 0.275 mole ($Na_2CO_3$ has a specific gravity of 2.533 g/ml, from which the volume of one $Na_2CO_3$ molecule can be calculated; if $Na_2CO_3$ is assumed to have a cubic structure, the area of its one face can be calculated, which is taken as the area occupied by superficial $Na_2CO_3$). According to the reaction scheme shown above, 0.275 mole of $Na_2CO_3$ has an ability of adsorbing 0.55 mole of $NO_2$. However, the quantity of $NO_x$ actually removed by the adsorbing catalyst of the present invention was approximately 0.04 mole which is less than 1/10 of the above-mentioned value. This difference is attributable to that the BET method evaluates the physical surface area and it takes the surface areas of the molecules other than $Na_2CO_3$ such as $Al_2O_3$, also into account. The evaluation given above indicates that the quantity of adsorbed $NO_x$ is much smaller than the $NO_x$-capturing ability of the $Na_2CO_3$ bulk, and $NO_x$ is captured only on the $Na_2CO_3$ surface or at least in a limited region in the vicinity of surface.

Figure 4:
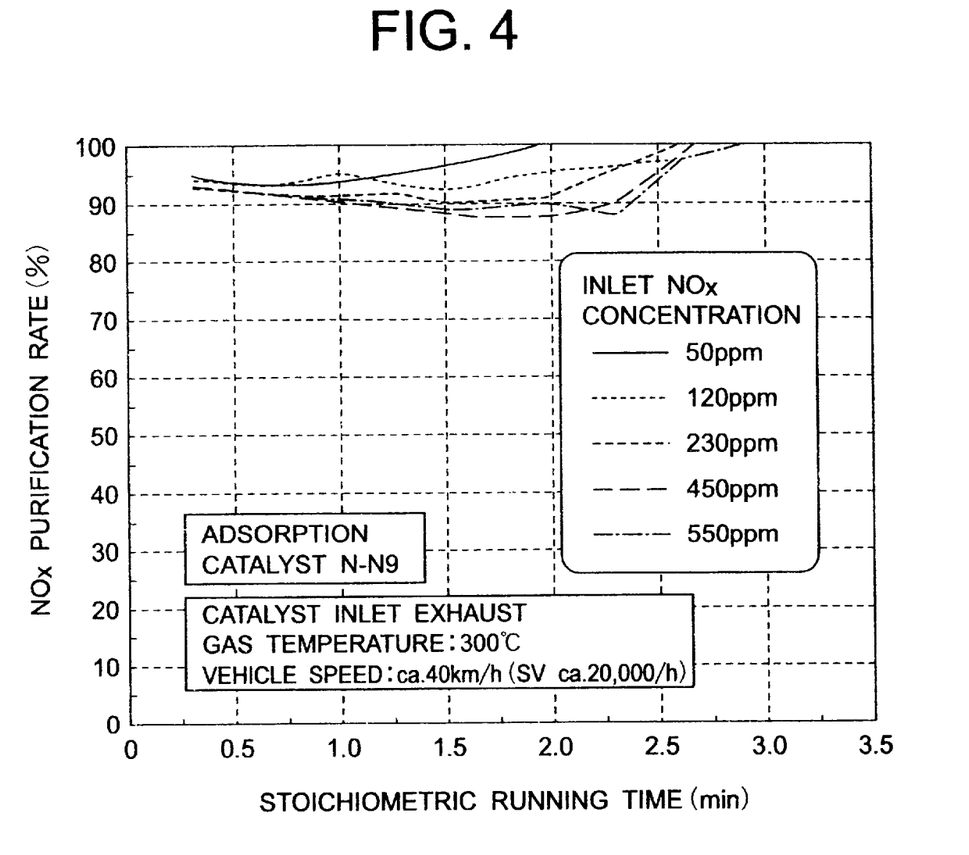
FIG. 4 is a graph illustrating $NO_x$ purification rate in the stoichiometric exhaust gas.

FIG. 4 illustrates the $NO_x$ purification rate just after the change-over from lean driving to stoichiometric driving. It is apparent that the adsorbing catalyst of the present invention gives an $NO_x$ purification rate of 90% or above from just after the change-over to stoichiometric running (or driving).

Figure 5A:
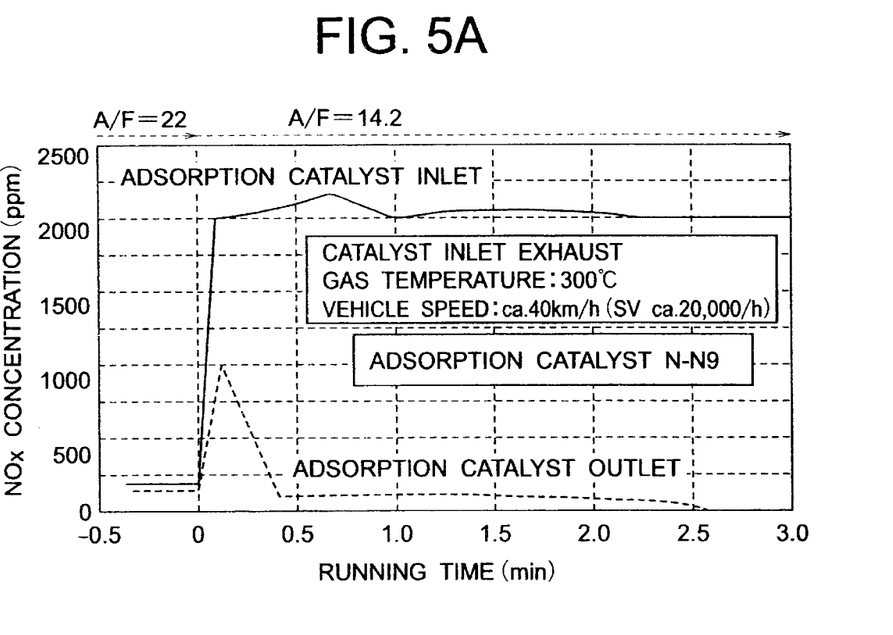
FIG. 5A and FIG. 5B are graphs illustrating the relation between the $NO_x$ concentration at the inlet of adsorption catalyst and the $NO_x$ concentration at the outlet of the adsorption catalyst at the time of change-over from a rich (stoichiometric) driving to a lean driving.
Figure 5B:
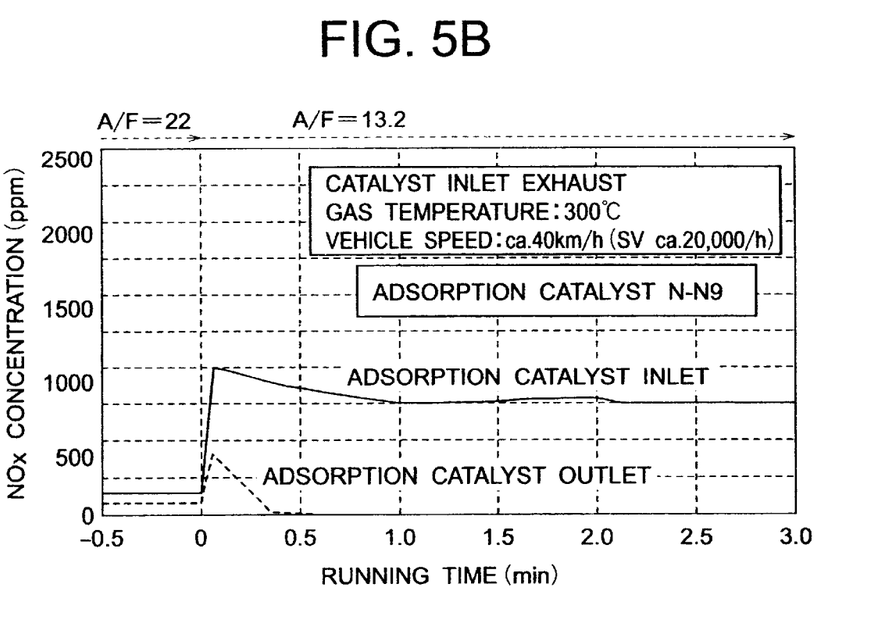

FIGS. 5A, 5B and FIGS. 6A, 6B illustrate the $NO_x$ purification characteristics before and after the change-over from lean running to stoichiometric or rich running. FIGS. 5A and 5B show $NO_x$ concentrations at the inlet and outlet of adsorption catalyst N-N9, wherein FIG. 5A illustrates a case of changing-over the air/fuel ratio from a lean driving of A/F=22 to a rich driving of A/F=14.2. At the time of starting the generation just after the change-over to rich driving, the $NO_x$ concentration in the exhaust gas of A/F 14.2 is so high that the inlet $NO_x$ concentration in the lean driving largely increases. Although the outlet $NO_x$ concentration also increases temporarily therewith, the outlet $NO_x$ concentration is usually much lower than the inlet $NO_x$ concentration. The regeneration progresses speedily, and the outlet $NO_x$ concentration reaches approximately zero in a short period of time. FIG. 5B illustrates a case of changing over the air/fuel ratio from a lean driving of A/F=22 to a rich driving of A/F=14.2. In this case, too, the outlet $NO_x$ concentration is usually much lower than the inlet $NO_x$ concentration similarly to the case of FIG. 5A, and the outlet $NO_x$ concentration reaches approximately zero in a shorter period of time than in FIG. 5A.

As is apparent from the above, the A/F value as a condition of regeneration exercises an influence upon the time required for regeneration. The A/F value, time and quantity of reducing agent suitable for regeneration are influenced by the composition, shape and temperature of adsorbing catalyst, the SV value, the kind of reducing agent, and the shape and length of exhaust gas passage. Accordingly, the conditions of regeneration should be decided with consideration of all these factors.

Figure 6A:
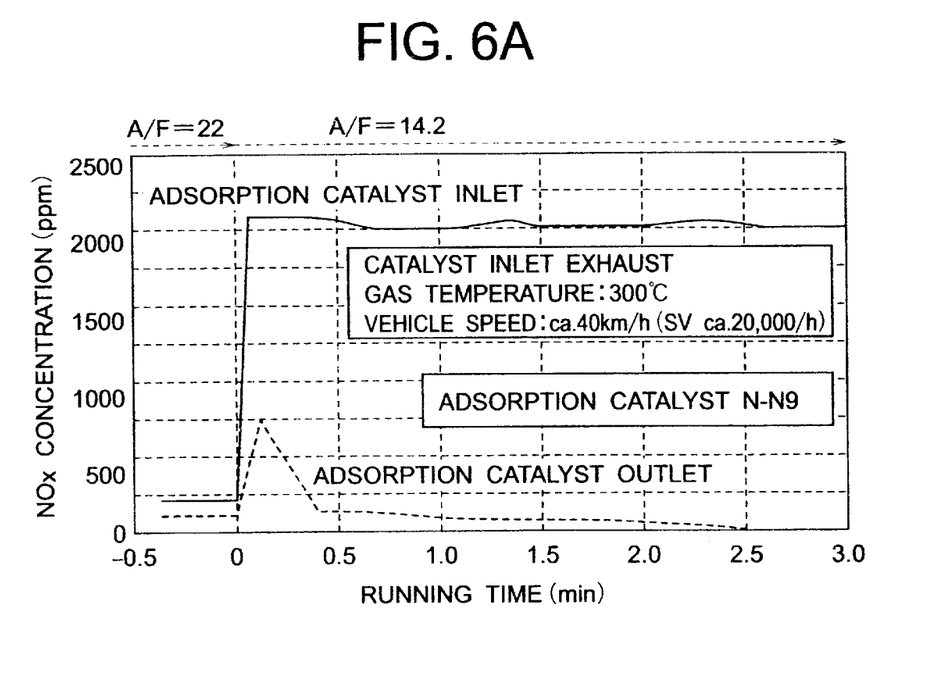
FIG. 6A and FIG. 6B are graphs illustrating the relation between the $NO_x$ concentration at the inlet of adsorption catalyst and the $NO_x$ concentration at the outlet of the adsorption catalyst at the time of change-over from a rich (stoichiometric) driving to a lean driving.
Figure 6B:
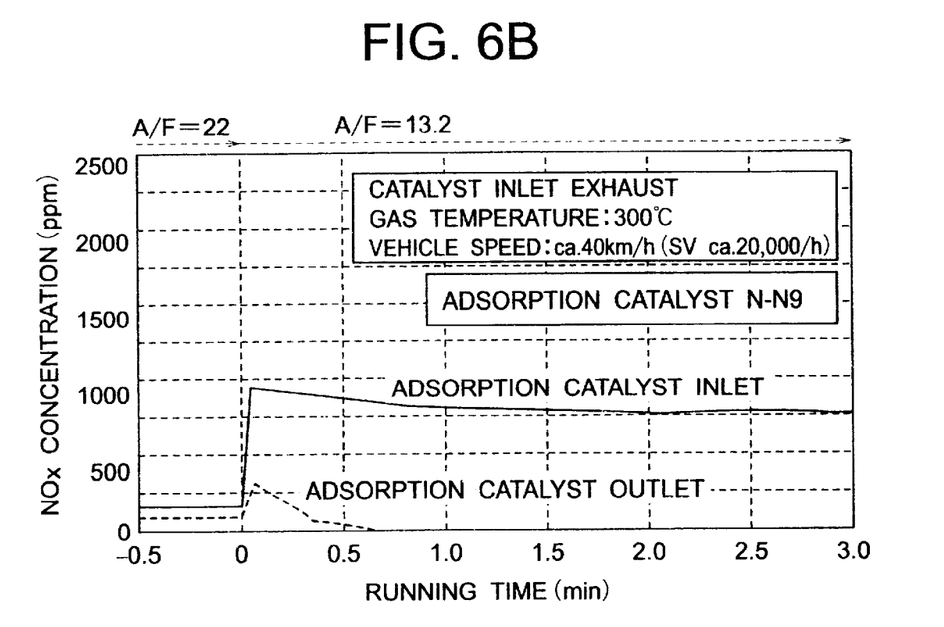

FIGS. 6A and 6B are graphs illustrating the $NO_x$ concentrations at inlet and outlet of adsorbing catalyst N-K9, wherein FIG. 6A is a case of changing over the air/fuel ratio from a lean driving of A/F=22 to a rich driving of A/F=14.2, and FIG. 6B is a case of changing over the air/fuel ratio from a lean driving of A/F=22 to a rich driving of A/F=14.2. Similarly to the above-mentioned case of adsorbing catalyst N-N9, the outlet $NO_x$ concentration is usually much lower than the inlet $NO_x$ concentration and regeneration of adsorbing catalyst progresses in a short period of time.

Apparatus for Purifying and Controlling Exhaust Gases

Figure 1:
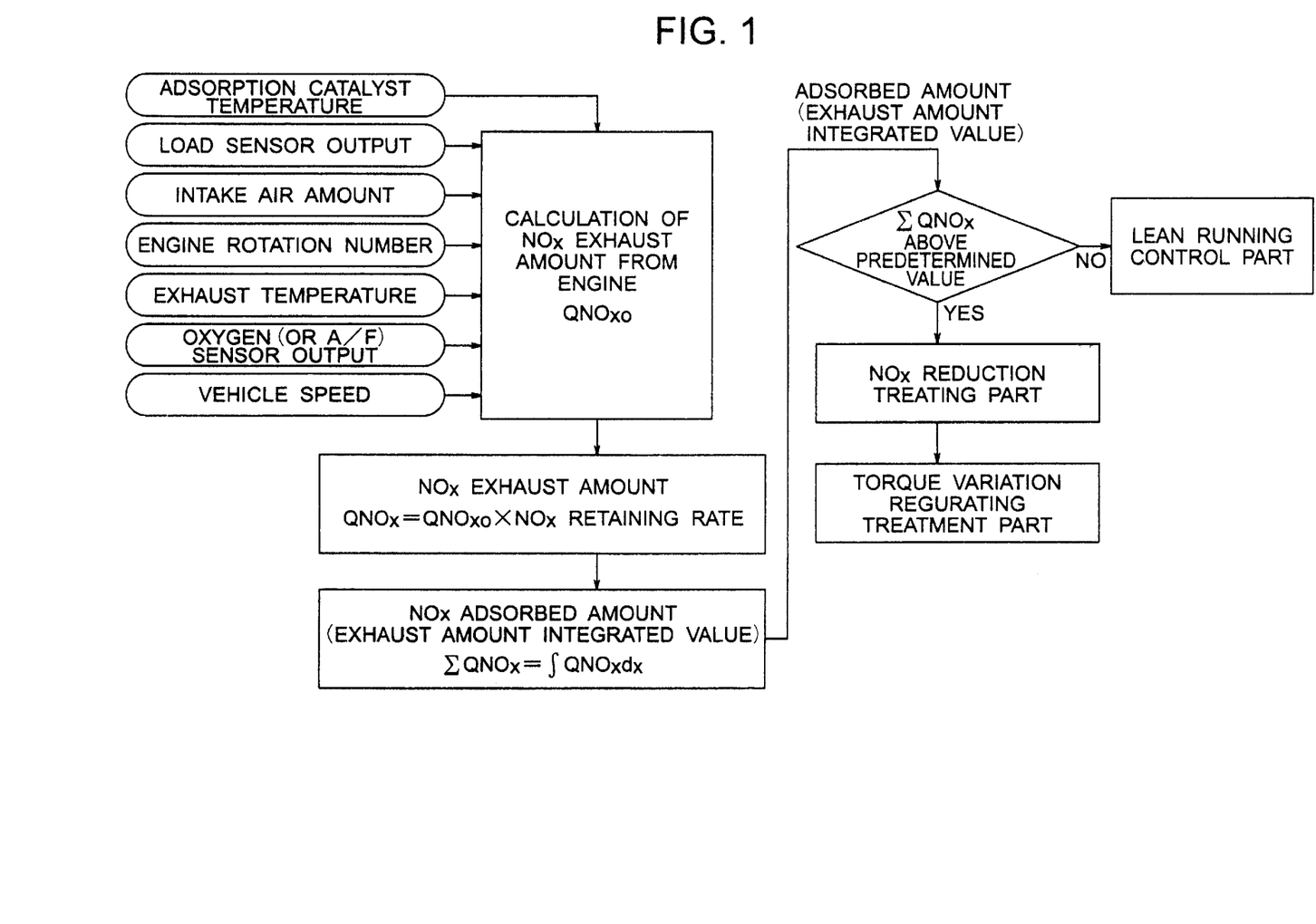
FIG. 1 illustrates the structure of an apparatus for purifying and controlling exhaust gases which constitutes a typical embodiment of the present invention.

FIG. 1 is an example of the apparatus for reducing $NO_x$ based on estimated quantity of adsorbed $NO_x$ according to the present invention. At least one quantity of state selected from the temperature of exhaust gas, the adsorption catalyst temperature, the vehicle speed, the air/fuel ratio, the rotation number of internal combustion engine, the load of the engine, the quantity of suction air (or intake air amount) and the quantity (or amount) of exhaust gas is input to the $NO_x$ discharge quantity-calculating part of the engine having the $NO_x$-adsorption catalyst. Then, the $NO_x$ discharge is multiplied by the residual $NO_x$ rate (proportion of residual $NO_x$ obtained by subtracting the quantity of $NO_x$ directly reduced to $N_2$) and the product is integrated over the time period of lean driving to determine the quantity of adsorbed $NO_x$ ($\Sigma Q_{NOx}$). When the value of $\Sigma Q_{NOx}$ thus calculated has exceeded a prescribed value, reduction treatment of $NO_x$ is carried out.

The reduction treatment of $NO_x$ adsorbed on the $NO_x$ adsorption catalyst is carried out by increasing the concentration of non-burnt hydrocarbon in the exhaust gas flowing into the catalyst. Concretely saying, this is realized by making the air/fuel ratio greater than the theoretical air/fuel ratio (namely, increasing the quantity of injected fuel) or, in the case of injection into cylinders, additionally injecting fuel in the expanding stroke or gas discharging stroke of the engine and thereby increasing the concentration of non-burnt hydrocarbon. Due to this increase, the $NO_x$ adsorbed on the $NO_x$ adsorption catalyst is reduced by the non-burnt hydrocarbon and made harmless. When the concentration of non-burnt hydrocarbon increases, there arises a possibility that the output torque of the engine or the final driving torque of the driving wheels can vary. This variation is prevented by changing any one factors selected from the group consisting of the ignition time, the quantity of inlet air, the quantity of exhaust gas to be mixed into inlet air of the internal combustion engine (EGR rate), the quantity of injected fuel, or the timing of fuel injection, or by controlling the electromotive motor assisting the output of internal combustion engine, the load of generator placed in the engine and the breaking of output side of the engine.

Figure 7:
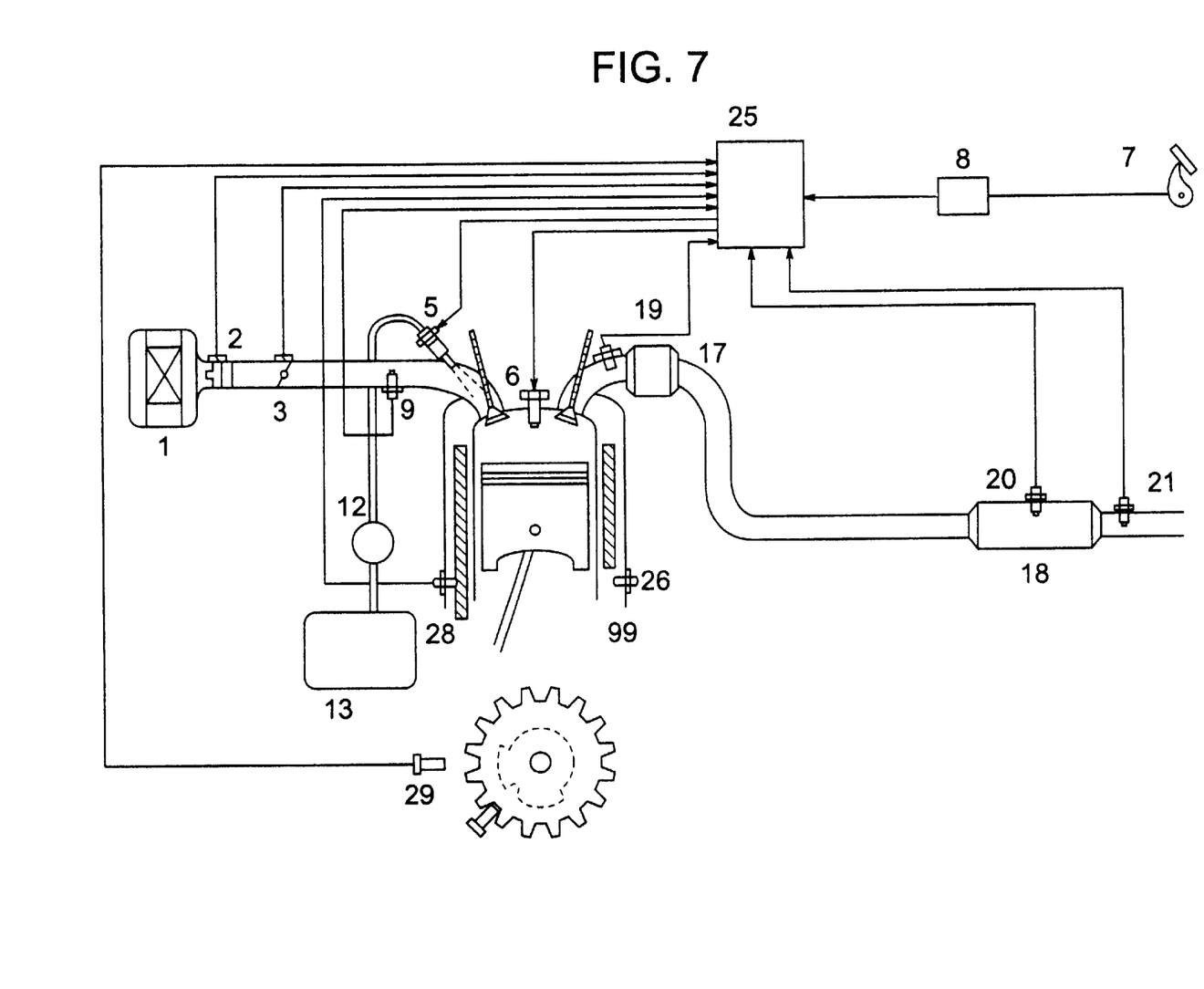
FIG. 7 is an outlined view illustrating an engine controlling system.

FIG. 7 is a diagram illustrating the system for controlling the internal combustion engine to realize the condition mentioned above.

That is, the apparatus of the present invention is constituted of an exhaust gas system having an engine 99 which can be worked at a lean burn, an air flow sensor 2, an air suction system having electronically controlled throttle valve 3, etc., an oxygen concentration sensor (or A/F sensor) 19, an exhaust gas temperature sensor 17, an $NO_x$ adsorption catalyst 18, etc. and a controlling unit (ECU) 25. The ECU is constituted of I/O LSI as an input-output interface, a computing unit MPU, memory devices RAM and ROM remembering a number of controlling programs, a timer counter, etc. ECU houses a controlling program carrying out the treatment of the present invention mentioned below, and estimates the $NO_x$ purification rate, compares the estimated values, and reduces $NO_x$ on the basis of various sensor signals. Into the $NO_x$ purification rate estimating part of the $NO_x$ adsorption catalyst is input at least one quantity of state selected from the group consisting of the quantity of $NO_x$ adsorbed on $NO_x$ adsorption catalyst, the temperature of exhaust gas, the temperature of adsorbing catalyst, the quantity of poisoning sulfur, the driving distance of automobile, the extent of deterioration of catalyst, the air/fuel ratio, the concentration of non-burnt hydrocarbon, the $NO_x$ concentration before the catalyst, the period of lean driving having passed from the time of change-over from stoichiometric driving (driving at theoretical air/fuel ratio) or rich driving to lean driving, the rotation number of internal combustion engine, the load of the engine, the quantity of inlet air, and the quantity of exhaust gas. When the estimated $NO_x$ purification rate has reached a prescribed value or below, the reduction treatment of $NO_x$ is carried out. The reduction treatment of $NO_x$ adsorbed on the $NO_x$ adsorption catalyst is carried out by increasing the concentration of non-burnt hydrocarbon in the exhaust gas flowing into the catalyst. Concretely saying, this is realized by making the air/fuel ratio greater than the theoretical air/fuel ratio (namely, by increasing the quantity of injected fuel) or, in the case of injection into cylinders, by additionally injecting fuel in the expanding stroke or gas discharging stroke of the engine and thereby increasing the concentration of non-burnt hydrocarbon. Due to this increase, the $NO_x$ adsorbed on the $NO_x$ adsorption catalyst is reduced by the non-burnt hydrocarbon and made harmless. When the concentration of non-burnt hydrocarbon is increased, there is a possibility that the output torque of the engine or the final driving torque of the driving wheels can vary. This variation is prevented by changing any one factors selected from the group consisting of the ignition time, the quantity of inlet air, the quantity of exhaust gas to be mixed into inlet air of the internal combustion engine (EGR rate, EGR valve), the quantity of injected fuel (injector 5), or the timing of fuel injection, or by controlling the electromotive motor assisting the output of internal combustion engine, the load of generator placed in the engine and the breaking of output side of the engine.

The above-mentioned apparatus for purifying and controlling exhaust gas functions as follows. That is, the air inlet into engine is filtered by air cleaner 1, measured by air flow sensor 2, passes electronically controlled valve 3, receives the fuel injected from injector 5, and supplied to engine 99 as a mixed gas. The signals of the air flow sensor and other sensors are input to ECU (engine control unit) 25.

ECU evaluates the working state of internal combustion engine and state of $NO_x$ adsorption catalyst by the method mentioned later, determines the driving air/fuel ratio, controls the injection time of injector 5, and thereby sets the fuel concentration in the mixed gas to the prescribed value. It is allowable to set the injector 5 so as to enable an injection into cylinders like in diesel engine, instead of setting it at the position of air suction boat of FIG. 7. It is also allowable to set the fuel concentration in the mixed gas to the prescribed value by keeping the quantity of injected fuel constant and decreasing the quantity of inlet air by an opening control (throttle actuator) of the electronically controlled throttle valve 3. The mixed gas inlet into cylinders is ignited with igniting plug 6 controlled by the signals of ECU 25, and burns. The exhaust gas of the combustion is led to the exhaust gas purification system. The exhaust gas purification system is provided with $NO_x$ adsorption catalyst which, in the period of stoichiometric driving, purifys $NO_x$, HC and CO in the exhaust gas by its ternary catalytic function and, in the period of lean driving, purifys $NO_x$ by its $NO_x$-adsorbing function and at the same time purifys HC and CO by its burning function. Further, based on the judgement and controlling signals of ECU, it always estimates the $NO_x$ purification ability of $NO_x$ adsorption catalyst in terms of estimated $NO_x$ purification rate in the period of lean driving so that when the $NO_x$ purification ability has decreased, the $NO_x$-adsorbing ability of the $NO_x$ adsorption catalyst is recovered by shifting the air-fuel ratio of the combustion to the rich side or injecting the fuel into cylinders in the expanding stroke or gas-discharging stroke. By these operations, the apparatus of the invention effectively purifys the exhaust gas under all the engine combustion conditions including lean driving and stoichiometric (including rich) driving.

In FIG. 7, 7 is an accelerating pedal, 8 is a load sensor, 9 is a suction air temperature sensor, 12 is a fuel pump, 13 is a fuel tank, 20 is an adsorption catalyst temperature sensor, 21 is an exhaust gas temperature sensor, 26 is a knock sensor (a knocking detecting sensor), 27 is EGR valve, 28 is a water temperature sensor, and 29 is a crank angle sensor.

The apparatus of the present invention is provided with an $NO_x$ adsorption catalyst having a function of directly reducing $NO_x$ to $N_2$ simultaneously, and the apparatus estimates the quantity of adsorbed $NO_x$ in a high accuracy and when the estimated value has exceeded a prescribed value, carries out a reduction treatment of the $NO_x$ adsorbed on the $NO_x$ adsorption catalyst, so that the apparatus of the present invention can purify $NO_x$ in a high efficiency over a long period of time without increasing the quantity of harmful exhaust gas.

What is claimed is:

1. An exhaust gas purification apparatus for use in a lean burn internal combustion engine comprising:
    an exhaust gas duct connected to an engine through which an exhaust gas containing NOx gas passes,
    an NOx adsorption catalyst configured with the capability to catalytically reduce NOx to $N_2$ even in a lean burn state, said adsorption catalyst being able simultaneously to chemically adsorb a part of NOx in the exhaust gas in the lean burn state wherein the amount of an oxidizing agent is larger than the amount of a reducing agent in a redox stoichiometric relation of components in the exhaust gas and to catalytically reduce NOx adsorbed on the catalyst in a state wherein the amount of the reducing agent is equal to or larger than the amount of the oxidizing agent, and
    a control apparatus which decides a timing for producing a state wherein the amount of the reducing agent is equal to or larger than the amount of the oxidizing agent, and carries out reduction treatment of the NOx adsorbed on the adsorption catalyst by catalytical reaction with the reducing agent to form harmless $N_2$, when the NOx adsorbed amount reaches a predetermined amount, which is calculated from the NOx amount obtained by subtracting the amount of NOx directly reduced to $N_2$ during the lean burn state from the amount of NOx discharged from the internal combustion engine.

2. An apparatus according to claim 1, wherein said adsorption catalyst is a composition comprising metals and metal oxides or composite oxides containing at least one element selected from the group consisting of potassium (K), sodium (Na), magnesium (Mg), strontium (Sr) and calcium (Ca), at least one element selected from rare earth elements, and at least one element selected from noble metals, or said composition supported on a porous heat-resistant metal oxide.

3. An apparatus according to claim 1, wherein said adsorbing catalyst is a composition comprising metals and metal oxides or composite oxides containing at least one element selected from the group consisting of potassium (K), sodium (Na), magnesium (Mg), strontium (Sr) and calcium (Ca), at least one element selected from rare earth elements, at least one element selected from noble metals, and at least one element selected from titanium and silicon, or said composition supported on a porous, heat-resistant metal oxide.

4. An apparatus according to claim 1, wherein the reduction treatment of the NOx adsorbed on the NOx adsorption catalyst is carried out by increasing a concentration of a non-burnt hydrocarbon in the exhaust gas flowing into the catalyst.

5. An apparatus according to claim 1, wherein the quantity of adsorbed NOx is estimated on the basis of at least one quantity of state selected from an ability of directly reducing NOx to $N_2$ and thereby making NOx harmless, a temperature of exhaust gas, a temperature of said adsorbing catalyst, a quantity of sulfur poisoning the catalyst, a driving distance of automobile, a degree of deterioration of the catalyst, an air/fuel ratio, a concentration of non-burnt hydrocarbon, an NOx concentration on the catalyst, a time of lean driving measured from the point in time of changing the driving at theoretical air/fuel ratio or a rich driving to a lean driving, a rotation number of internal combustion engine, a load of the engine, a quantity of air inlet into the engine, and a quantity of exhaust gas.

6. An apparatus according to claim 1, wherein the reduction treatment of the NOx adsorbed on the NOx adsorption catalyst is carried out, in the case where a variation of torque appears, by controlling the output torque of the internal combustion engine so as to suppress the variation of torque.

7. An apparatus according to claim 6, wherein the control of output torque is carried out by changing at least one factor selected from the group consisting of a time of ignition, a quantity of inlet air, a quantity of exhaust gas to be mixed into suction gas of internal combustion engine (EGR ratio), a quantity of injected fuel, a timing of fuel injection, an electromotive motor assisting the internal combustion engine, a load of dynamo provided in the engine, and a breaking in the output side of the engine.

8. An exhaust gas purification apparatus for use in a lean burn internal combustion engine comprising:
    an exhaust gas duct connected to an engine through which an exhaust gas containing NOx gas passes,
    configured with the capability to catalytically reduce NOx to $N_2$ even in a lean burn state, said adsorption catalyst containing as a part of catalyst components at least one element selected from the group consisting of potassium, sodium, magnesium, strontium and calcium, and being able simultaneously to chemically adsorb a part of NOx in the exhaust gas in the lean burn state wherein the amount of an oxidizing agent is larger than the amount of a reducing agent in a redox stoichiometric relation of components in the exhaust gas and to catalytically reduce NOx adsorbed on the catalyst in a state wherein the amount of the reducing agent is equal to or larger than the amount of the oxidizing agent, and
    a control apparatus which decides a timing for producing a state wherein the amount of the reducing agent is equal to or larger than the amount of the oxidizing agent, and carries out reduction treatment of the NOx adsorbed on the adsorbing catalyst by catalytical reaction with the reducing agent to form harmless $N_2$, when the NOx adsorbed amount reaches a predetermined amount, which is calculated from the NOx amount obtained by subtracting the amount of NOx directly reduced to $N_2$ during the lean burn state from the amount of NOx discharged from the internal combustion engine.

9. An apparatus according to claim 8, wherein said adsorption catalyst is a composition comprising metals and metal oxides or composite oxides containing at least one element selected from the group consisting of potassium (K), sodium (Na), magnesium (Mg), strontium (Sr) and calcium (Ca), at least one element selected from rare earth elements, and at least one element selected from noble metals, or said composition supported on a porous, heat-resistant metal oxide.

10. An apparatus according to claim 8, wherein said adsorbing catalyst is a composition comprising metals and metal oxides or composite oxides containing at least one element selected from the group consisting of potassium (K), sodium (Na), magnesium (Mg), strontium (Sr) and calcium (Ca), at least one element selected from rare earth elements, at least one element selected from noble metals, and at least one element selected from titanium and silicon, or said composition supported on a porous, heat-resistant metal oxide.

11. An apparatus according to claim 8, wherein the reduction treatment of the NOx adsorbed on the NOx adsorption catalyst is carried out by increasing a concentration of a non-burnt hydrocarbon in the exhaust gas flowing into the catalyst.

12. An apparatus according to claim 8, wherein the quantity of adsorbed NOx is estimated on the basis of at least one quantity of state selected from an ability of directly reducing NOx to $N_2$ and thereby making the NOx harmless, a temperature of exhaust gas, a temperature of said adsorbing catalyst, a quantity of sulfur poisoning the catalyst, a driving distance of automobile, a degree of deterioration of the catalyst, an air/fuel ratio, a concentration of non-burnt hydrocarbon, an NOx concentration on the catalyst, a time of lean driving measured from the point in time of changing the driving at theoretical air/fuel ratio or a rich driving to a lean driving, a rotation number of internal combustion engine, a load of the engine, a quantity of air inlet into the engine, and a quantity of exhaust gas.

13. An apparatus according to claim 8, wherein the reduction treatment of the NOx adsorbed on the NOx adsorption catalyst is carried out, in the case where a variation of torque appears, by controlling the output torque of the internal combustion engine so as to suppress the variation of torque.

14. An exhaust gas purification apparatus for use in a lean burn internal combustion engine comprising:
an exhaust gas duct connected to an engine through which an exhaust gas containing NOx gas passes,
an NOx adsorption catalyst configured with the capability to catalytically reduce NOx to $N_2$ even in a lean burn state, said adsorption catalyst containing as a part of catalyst components at least one element selected from the group consisting of potassium, sodium, magnesium, strontium and calcium, and being able simultaneously to capture a part of NOx by chemical bonding in the exhaust gas on a surface and near the surface of the adsorption catalyst in the lean burn state wherein the amount of an oxidizing agent including an oxygen gas is larger than the amount of a reducing agent including a hydrocarbon in a redox stoichiometric relation of components in the exhaust gas, and to catalytically reduce NOx captured on the catalyst in a state wherein the amount of the reducing agent is equal to or larger than the amount of the oxidizing agent, and
a control apparatus which decides a timing for producing a state wherein the amount of the reducing agent is equal to or larger than the amount of the oxidizing agent, and carries out reduction treatment of the NOx captured on the adsorbing catalyst by catalytical reaction with the reducing agent to form harmless $N_2$, when the NOx captured amount reaches a predetermined amount, which is calculated from the NOx amount obtained by subtracting the amount of NOx directly reduced to $N_2$ during the lean burn state from the amount of NOx discharged from the internal combustion engine.

15. An apparatus according to claim 14, wherein the reduction treatment of the NOx adsorbed on the NOx adsorption catalyst is carried out by increasing a concentration of a non-burnt hydrocarbon in the exhaust gas flowing into the catalyst.

16. An apparatus according to claim 14, wherein the quantity of adsorbed NOx is estimated on the basis of at least one quantity of state selected from an ability of directly reducing NOx to $N_2$ and thereby making the NOx harmless, a temperature of exhaust gas, a temperature of said adsorbing catalyst, a quantity of sulfur poisoning the catalyst, a driving distance of automobile, a degree of deterioration of the catalyst, an air/fuel ratio, a concentration of non-burnt hydrocarbon, an NOx concentration on the catalyst, a time of lean driving measured from the point in time of changing the driving at theoretical air/fuel ratio or a rich driving to a lean driving, a rotation number of internal combustion engine, a load of the engine, a quantity of air inlet into the engine, and a quantity of exhaust gas.

17. An apparatus according to claim 14, wherein the reduction treatment of the NOx adsorbed on the NOx adsorption catalyst is carried out, in the case where a variation of torque appears, by controlling the output torque of the internal combustion engine so as to suppress the variation of torque.

18. An exhaust gas purification apparatus for use in a lean burn internal combustion engine comprising:
an exhaust gas duct connected to an engine through which an exhaust gas containing NOx gas passes,
an NOx capturing catalyst configured with the capability to catalytically reduce NOx to $N_2$ even in a lean burn state, said catalyst being able simultaneously to capture a part of NOx in the exhaust gas in the lean burn state wherein the amount of an oxidizing agent is larger than the amount of a reducing agent in a redox stoichiometric relation of components in the exhaust gas and to catalytically reduce NOx captured by the catalyst in a state wherein the amount of the reducing agent is equal to or larger than the amount of the oxidizing agent, and
a control apparatus which decides a timing for producing a state wherein the amount of the reducing agent is equal to or larger than the amount of the oxidizing agent, and carries out reduction treatment of the NOx captured by the catalyst by catalytical reaction with the reducing agent to form harmless $N_2$, when the NOx captured amount reaches a predetermined amount, which is calculated from the NOx amount obtained by subtracting the amount of NOx directly reduced to $N_2$ during the lean burn state from the amount of NOx discharged from the internal combustion engine.

19. A control apparatus used in an apparatus for purifying an exhaust gas from a lean burn internal combustion engine, comprising
a means for deciding a timing for producing a state wherein the amount of a reducing agent is equal to or larger than the amount of an oxidizing agent, and
a means for carrying out a reduction treatment of NOx adsorbed on an adsorbing catalyst by catalytical reaction with the reducing agent to form harmless $N_2$ and simultaneously to catalytically reduce NOx to $N_2$ during a lean burn state, when the amount of NOx adsorbed on the adsorbing catalyst reaches a predetermined amount, which is calculated from an NOx amount obtained by subtracting an amount of NOx directly reduced to $N_2$ during the lean burn state from an amount of NOx discharged from the internal combustion engine.

* * * * *